UNITED STATES PATENT OFFICE 2,480,080

PERHALOMETHYLCYCLOHEXENES

Waldo B. Ligett, Detroit, Mich., and Earl T. McBee, La Fayette, and Vincent V. Lindgren, West Lafayette, Ind., assignors to Purdue Research Foundation, West Lafayette, Ind., a corporation of Indiana No Drawing. Application November 13, 1945, Serial No. 628,376

4 Claims. (Cl. 260—648)

This invention relates to a novel group of unsaturated alicyclic halocarbons, particularly the perhalomethylcyclohexenes, and specifically the chlorofluoromethylcyclohexenes.

A desirable property of certain members of this group of compounds, especially those having at least one —$CF_3$— group in the ring, is their stability in certain chemical reactions. The —$CF_2$— group, being very stable, imparts desirable properties to the rest of the molecule. It is, therefore, among the objects of this invention to provide new halocarbons certain of which, because of their stable and non-flammable characteristics, are desirable as dielectric and heat transfer media. These compounds are also useful as chemical intermediates.

We have prepared representative members of this group of compounds and have determined certain of their physical constants whereby they may be identified. The compounds in general are colorless liquids which are insoluble in water. The members herein identified have boiling points above 100 degrees centigrade at atmospheric pressure. These compounds are readily soluble in other chlorofluoro compounds, and are likewise soluble in organic solvents such as alcohol and ether.

The compounds may be prepared by treating an appropriate halogenated cyclic compound, such as pentachlorobenzotrifluoride, with a fluorinating agent capable of saturating any double bonds, if present, in addition to replacing any hydrogen, and part of the chlorine atoms in the compound. The reaction may be carried out, for example, in a step-wise manner, comprising successive treatments of the appropriate halogenated cyclic compound, first with bromine trifluoride and then with antimony pentafluoride. The antimony pentafluoride, in this case, is used to replace, with fluorine, any bromine which may have been introduced during the reaction with bromine trifluoride. The product may then be dehalogenated and rectified to yield a perhalomethylcyclohexene. Silver difluoride may also be employed as a fluorinating agent, utilizing a brief contact period and a mild reaction temperature, the resulting product being dehalongenated and rectified.

The invention herein is not concerned with the process of manufacture or apparatus employed, but is concerned solely with the new group of compounds herein described and claimed. The example below illustrates one method by which this new group of compounds may be prepared, but is in no way to be construed as limiting the invention thereto.

Six hundred and forty-six grams of bromine trifluoride was placed in a nickel tube, 5.2 centimeters in diameter and 50 centimeters in length, fitted with a motor-driven nickel propeller stirrer. The reaction vessel, containing bromine trifluoride, was cooled to zero degrees centigrade and pentachlorobenzotrifluoride was added thereto in small quantities with continuous stirring. After the first 100 grams and each of the following 200-gram quantities had been added, the reactor was heated to 90 degrees centigrade and then cooled to zero degrees centigrade. This prevented the accumulation of starting materials and possible subsequent explosion or pyrolysis thereof. The mixture was then heated overnight at 150 degrees centigrade. The liquid product was cautiously washed with water to remove excess bromine trifluoride. The organic material was neutralized with dilute alkali and washed with water. Upon separation, 685 grams of a colorless liquid was obtained.

A second batch of 600 grams of pentachlorobenzotrifluoride was treated in a similar manner with bromine trifluoride. Eight hundred and one grams of bromine trifluoride was placed in a nickel tube and cooled to five degrees centigrade. Six hundred grams of pentachlorobenzotrifluoride was added thereto in small quantities, the rate of addition being, as usual, necessarily slow to prevent burning. The entire mixture was heated at 130 degrees centigrade for 36 hours. The product solidified in an ice bath and was washed at elevated temperatures with aqueous alkali and water, which were later removed by vacuum distillation.

The product from the two reactions was combined in a three-neck flask fitted with stirrer, reflux condenser and dropping funnel. One and one-half moles of antimony pentafluoride was added thereto at a temperature between 60 and 70 degrees centigrade over a period of three hours. Th mixture was then heated to 140 degrees centigrade and maintained at this temperature for about eight hours, during which time approximately 125 grams of bromine was distilled from the reaction mixture. The organic product, after being washed with hot, concentrated hydrochloric acid, weighed 1018 grams, and was a mixture of average composition $C_6Cl_4F_7$—$CF_3$.

In order to accomplish dehalogenation, this halocarbon was subjected to two treatments with zinc dust in ethanol. The first was with 535 grams of zinc dust suspended in 200 milliliters of ethanol at 90 degrees centigrade. The second was with 100 grams of zinc dust at 135 degrees centigrade. Five hundred sixty-nine grams of dehalogenated product was rectified in a four-foot, glass-packed column. The compounds separated from the reaction product included dichloroheptafluoro(trifluoromethyl) cyclohexene and trichlorohexafluoro(trifluoromethyl) cyclohexene. These compounds are identified as follows:

| Compound | Boiling Point °C. | Approximate Freezing Point, °C. | R. I. at 20° C. | Density, gm./ml. |
| --- | --- | --- | --- | --- |
| $C_6Cl_2F_7$—$CF_3$ | 128.5–129.5 at 750 mm. of Hg | below −70° | 1.3681 | 1.759 at 25° C. |
| $C_6Cl_3F_6$—$CF_3$ | 158.0–160.0 at 745 mm. of Hg | below −70° | 1.3930 | 1.792 at 25° C. | separated from the reaction product included di-

Other members of this class of compounds within the scope of our invention which may be prepared by processes as previously disclosed include pentachlorotetrafluoro(trifluoromethyl)-cyclohexene, tetrachloropentafluoro) chlorodifluoromethyl) cyclohexene, trichlorohexafluoro-(dichlorofluoromethyl) cyclohexene and other fluorine-containing perhalo derivatives of methylcyclohexene.

We claim:

1. A perhalomethylcyclohexene, containing fluorine and chlorine as the only halogens in the molecule, wherein the methyl group contains three fluorine atoms.

2. Dichloroheptafluoro(trifluoromethyl) cyclohexene.

3. Trichlorohexafluoro(trifluoromethyl) cyclohexene.

4. A compound according to claim 1 wherein the ring contains at least one —$CF_2$— group.

WALDO B. LIGETT.
EARL T. McBEE.
VINCENT V. LINDGREN.

REFERENCES CITED

The following references are of record in the file of this patent:

Van der Linden, "Rec. travaux chim. des Pays-Bas," vol. 57, 1075–1086 (1938).

Van der Linden, "Rec. travaux chim. des Pays-Bas," vol. 55, 569–576 (1936).

Bigelow and Pearson, "J. A. C. S.," vol. 56, 2773–74 (1934).